United States Patent [19]

Wolfseder

[11] 4,351,231

[45] Sep. 28, 1982

[54] MASH COPPER

[75] Inventor: Alfons Wolfseder, Freising, Fed. Rep. of Germany

[73] Assignee: Anton Steinecker Maschinenfabrik GmbH, Fed. Rep. of Germany

[21] Appl. No.: 255,210

[22] Filed: Apr. 27, 1981

[30] Foreign Application Priority Data

Jun. 12, 1980 [DE] Fed. Rep. of Germany ....... 3022050

[51] Int. Cl.³ .............................................. C12H 1/00
[52] U.S. Cl. .................................. 99/277.2; 366/144; 99/348
[58] Field of Search .................... 99/277.2, 277.1, 348, 99/276; 366/144, 146, 147, 148, 149

[56] References Cited

U.S. PATENT DOCUMENTS

| | | | |
|---|---|---|---|
| 2,586,133 | 2/1952 | Wilken | 99/277.2 |
| 3,547,413 | 12/1970 | Nonlist | 99/277.2 |
| 3,791,630 | 2/1974 | Hinds | 366/144 |
| 4,163,417 | 8/1979 | Wolfseder | 99/277.2 |

FOREIGN PATENT DOCUMENTS 1177590 9/1964 Fed. Rep. of Germany ..... 99/277.2

Primary Examiner—Robert W. Jenkins
Attorney, Agent, or Firm—Learman & McCulloch

[57] ABSTRACT

A mash tun or copper having a body of circular cross-section and a heated bottom which is inclined to the center and having two planar bottom portions and two roof-like gusset portions. Such a mash copper is distinguished by an excellent energy-saving mixing of the tun content.

8 Claims, 5 Drawing Figures

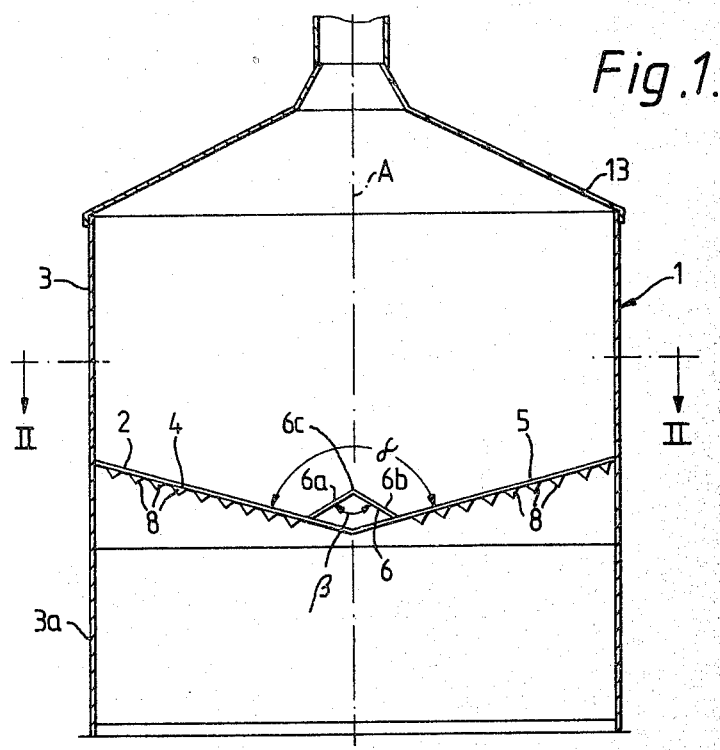
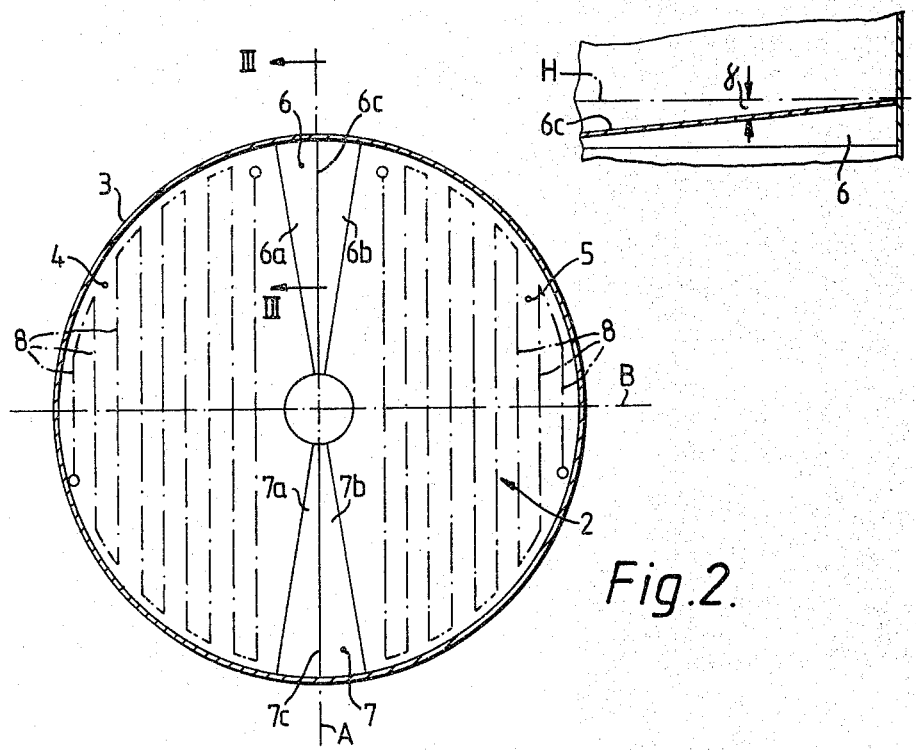

MASH COPPER

BACKGROUND OF THE INVENTION

The invention relates to a mash copper (or mash tun) having a body of circular cross-section and a tun bottom inclined to the centre and constructed as a heating surface.

Mash coppers having a circular cross-section and a conical or uniformly arched heating bottom are known. In such mash coppers the mixing of the mash and the heat transfer are not optimal. The mash is moved with a pushing motion in the copper, the mash particles preferably moving in horizontal planes. To obtain, in spite of this, a sufficient mixing and an improved heat transfer flow breakers must generally be installed and in addition a relatively high speed of rotation of the agitator must be used. However, high peripheral speeds of the stirrer or agitator have technological disadvantages because there is a danger of damage to the glume particles both at the sharp-edged parts of the agitator and of the flow breakers.

Furthermore, mash coppers having a rectangular cross-section also are known. In such mash coppers, although a more pronounced upward movement of the mash particles and thus an improved mixing is obtained, in the vicinity of the (usually rounded) corners of the vessel a pulsating stirring action results and thus an irregular heat transfer. Also disadvantageous is the large peripheral speed of the agitators required in mash coppers with rectangular cross-section and the relatively high energy consumption.

SUMMARY OF THE INVENTION

The invention has for its objective avoidance of the defects of the known constructions by providing a mash copper which is distinguished by an excellent energy-saving mixing of the tun content wherein a uniform migration of the mash particles from the bottom to the top take place, an approximately uniform contact of all mash particles with the heating surface exists, and in addition a particularly careful treatment of the mash is ensured.

This objective is achieved according to the invention by a construction in which the bottom of a mash copper of circular cross-section comprises the following parts:

(a) two planar bottom portions which are disposed in mirror-image manner with respect to a first vertical centre plane of the copper and include an angle between about 140° and 156°, (b) two gusset portions which are disposed in mirror-image manner with respect to a second vertical centre plane of the copper offset by about 90° with respect to the first and taper from the periphery to the centre of the copper bottom and the roof-like inclined surfaces of which enclose with each other an angle between about 90° and 130° and the ridge-like edge of which forms with the horizontal an angle between about 3° and 5°.

DESCRIPTION OF THE DRAWINGS

The foregoing and other details of the invention will become apparent from the following description of a presently preferred embodiment illustrated in the accompanying drawings, wherein:

FIG. 1 is a vertical sectional view through a mash copper taken along the vertical plane B of FIG. 2, the agitator being omitted;

FIG. 2 is a horizontal cross-sectional view along the line II—II of FIG. 1;

FIG. 3 is a partial vertical section through a gusset portion on the copper bottom corresponding to the section III—III in FIG. 2;

DETAILED DESCRIPTION

Figure 4:
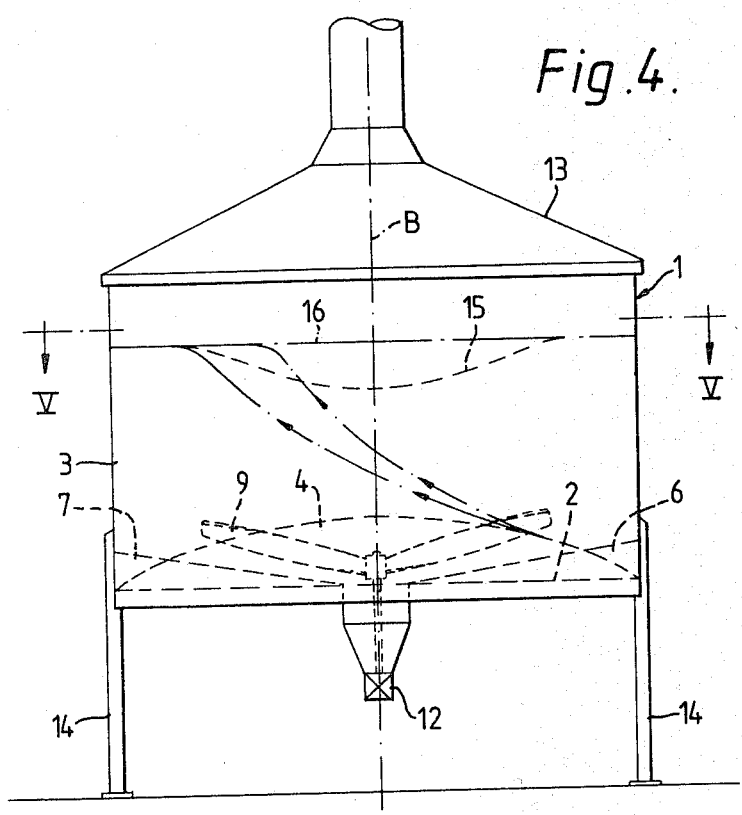
FIG. 4 is a vertical sectional view in the vertical centre plane A of FIG. 5, including an agitator for illustrating the flow conditions in the copper.

The construction of the tun bottom itself will first be explained with particular reference to FIGS. 1-3.

The mash tun or copper has a body 1 which, as is apparent from FIG. 2, is of circular cross-section. The bottom 2 is constructed as a heating surface and is inclined to the centre. The bottom 2 is secured, preferably welded, within the cylindrical wall 3 of the copper 1.

The tun bottom 2 itself comprises a plurality of portions, i.e., two planar portions 4, 5 and two gusset portions 6, 7 tapering from the periphery to the centre of the bottom 2. The two planar bottom portions 4, 5, which constitute the clearly greater part of the area of the bottom 2, are disposed in mirror-image manner with respect to a first vertical centre plane A of the copper 1, enclosing an angle $\alpha$ between 140° and 156°, and preferably about 150°. The two gusset portions 6, 7, which represent only a relatively small part of the bottom area (cf. especially FIG. 2), have a roof-like cross-section (cf. gusset portion 6 in FIG. 1), the roof-like inclined surfaces 6a, 6b and 7a, 7b of each gusset portion 6, 7 enclosing an angle B between 90° and 130°, and preferably about 110°. The tapering gusset portions 6, 7 have ridge-like (upper) edges 6c, 7c forming, as shown in FIG. 3, an angle $\gamma$ between 3° and 5° to a horizontal plane H. The two gusset portions 6, 7 are disposed in mirror-image manner with respect to a second vertical centre plane B of the copper 1, the second vertical centre plane being offset by 90° with respect to the first vertical centre plane A.

Since the tun bottom 2 is intended as a heating surface for the mash copper 1, heating means are necessary and may be provided in the usual manner on the lower side of the tun bottom in the form of heating channels, heating conduits, etc. In the disclosed tun bottom construction, however, it is preferred to provide heating channels 8 at the lower sides of the two planar bottom portions 4, 5 only; thus, no heating of the bottom takes place beneath the gusset portions 6, 7. The heating channels 8 are, as is apparent in particular from FIG. 2, substantially rectilinear and extend substantially parallel to each other and parallel to the first vertical centre plane A (and thus also parallel to the ridge-like edges 6c, 7c of the gusset portions 6, 7, which also lie in the plane A). The heating channels 8 may be constructed in any suitable form, for example as welded-on tubes, half-tubes or, as is illustrated in FIG. 1, by welded-on angle pieces. The heating of the tun bottom 2 is thus indirect, for example with the aid of steam or a suitable heating liquid (e.g., high-pressure hot water). The construction and arrangement of the heating channels 8 outlined above are particularly simple compared to known tun bottom constructions in which double jackets or spirally welded heating tubes or channels are provided for the heating elements.

Figure 5:
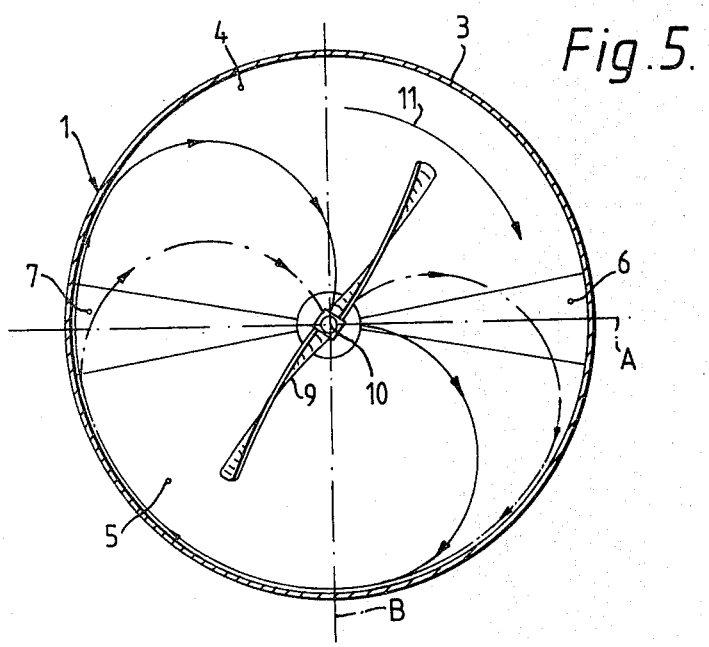
FIG. 5 is a horizontal sectional view along the line V—V of FIG. 4, and illustrating the flow conditions in the copper.

As is illustrated in FIGS. 4 and 5 the mash copper 1 includes an agitator blade 9 which is disposed in the centre of the tun bottom 2 and can be rotatably driven about a vertical axis 10, in this case in the direction of the arrow 11. In the embodiment of FIG. 4 the agitator means is driven from below by a drive motor 12 and suitable couplings. The mash copper 1 may otherwise be constructed in the usual manner and depending on the type of construction, have a cover 13 which is flat or conical, as shown in FIGS. 1 and 4. The copper can be supported on low extension 3a (FIG. 1) of the cylindrical casing 3 or on separate supports 14 (FIG. 4).

The mode of operation of the mash copper is illustrated in FIGS. 4 and 5 by corresponding arrows. During the operation the agitator blade 9 is set in rotation in the direction of the arrow 11, the blade 9 being driven at a peripheral speed between 2.0 to 2.8 m/s, and preferably at a peripheral speed of about 2.5 m/s. The mash heated indirectly by the heating channels 8 via the bottom 2 is set in motion in the direction of the arrows illustrated in FIGS. 4 and 5, and forms a relatively flat depression 15 shown in dash lines, in the central region of the mash surface 16. This depression, which is relatively small compared with known constructions, prevents oxygen from being dispersed into the mash and is advantageous as regards the quality of the final product.

The construction and arrangement of the gusset portions 6, 7 of the tun bottom 2 also have a particularly favourable effect. In spite of the relatively small peripheral speed of the agitator 9 compared with known constructions these gusset portions 6, 7 contribute to an extremely good mixing of the mash moving as indicated by the arrows in FIGS. 4 and 5; the gusset portions 6, 7 act simultaneously as so-called flow or wave breakers in the mash moved by the agitator blade 9, reliably preventing a purely circular motion of the entire mash filling, i.e., a rotating mash filling. In addition, the relatively low peripheral speed of the agitator 9 and the shape of the gusset portions 6, 7 reliably prevent any glume particles in the mash from being damaged.

The disclosed embodiment is representative of a presently preferred form of the invention, but is intended to be illustrative rather than definitive thereof. The invention is defined in the claims.

I claim:

1. A mash copper construction having a body of circular cross-section and a tun bottom, said bottom having two planar bottom portions disposed in mirror-image manner with respect to a first vertical centre plane passing through the copper body and including therebetween an angle between about 140° and 156°; and two gusset portions disposed in mirror-image manner with respect to a second vertical centre plane passing through the copper body and offset by 90° with respect to said first plane and tapering from the periphery toward the centre of the copper bottom, said gusset portions having roof-like inclined surfaces enclosing an angle between about 90° and 130° and a ridge-like upper edge at an angle to the horizontal of between about 3° and 5°.

2. A construction according to claim 1 wherein the angle included between the two bottom portions is about 150°.

3. A construction according to claim 1 wherein the roof-like inclined surfaces of each gusset portion enclose an angle of about 110°.

4. A construction according to claim 1 including agitator blade means in said body rotatable about a substantially vertical axis, and means for rotating said blade means.

5. A construction according to claim 4 wherein said agitator blade means is rotated at a peripheral speed between about 2.0 to 2.8 m/s.

6. A construction according to claim 4 wherein said agitator blade means is rotated at a peripheral speed of about 2.5 m/s.

7. A construction according to claim 1 including heating tun at the lower sides of the two planar bottom portions only.

8. A construction according to claim 7 wherein said heating means comprise channels extending substantially parallel to each other and substantially parallel to the first vertical centre plane.

* * * * *